United States Patent
Dupart et al.

(10) Patent No.: US 10,217,041 B2
(45) Date of Patent: Feb. 26, 2019

(54) RADIO-FREQUENCY IDENTIFICATION DEVICE FOR A TUBULAR ELEMENT TO BE IDENTIFIED IN A CONSTRAINED ENVIRONMENT

(71) Applicant: SYSTEMES ET TECHNOLOGIES IDENTIFICATION (STID), Greasque (FR)

(72) Inventors: Vincent Dupart, Saint-Maximin-la-Sainte-Beaume (FR); Aurélie Margalef, Rousset (FR); Sylvain Poitrat, Greasque (FR)

(73) Assignee: SYSTEMES ET TECHNOLOGIES IDENTIFICATION (STID), Greasque (FR)

( * ) Notice: Subject to any disclaimer, the term of this patent is extended or adjusted under 35 U.S.C. 154(b) by 0 days.

(21) Appl. No.: 15/875,142

(22) Filed: Jan. 19, 2018

(65) Prior Publication Data
US 2018/0157952 A1   Jun. 7, 2018

Related U.S. Application Data

(63) Continuation of application No. PCT/FR2016/051896, filed on Jul. 21, 2016.

(30) Foreign Application Priority Data

Jul. 21, 2015   (FR) .................................... 15 56877

(51) Int. Cl.
*H01Q 1/22*   (2006.01)
*G06K 19/00*   (2006.01)
(Continued)

(52) U.S. Cl.
CPC ..... *G06K 19/07758* (2013.01); *G06K 19/005* (2013.01); *G06K 19/04* (2013.01);
(Continued)

(58) Field of Classification Search
CPC .......... G06K 19/07758; G06K 19/005; G06K 19/04; G06K 19/07773; G06K 19/07786; G06K 19/0779; H01Q 1/2208
See application file for complete search history.

(56) References Cited

U.S. PATENT DOCUMENTS 6,657,542 B2 * 12/2003 Usami .............. G06K 19/07786
257/E23.01
7,151,979 B2 * 12/2006 Andersen ............... B65H 18/28
700/214
(Continued)

FOREIGN PATENT DOCUMENTS

DE   102005058385   6/2007
EP   2765537   8/2014

OTHER PUBLICATIONS

International Search Report for International Application PCT/US2016/051896, dated Nov. 24, 2016.

*Primary Examiner* — Joseph H Feild
*Assistant Examiner* — Rufus C Point
(74) *Attorney, Agent, or Firm* — Burris Law, PLLC

(57) ABSTRACT

A radio-frequency identification device for identifying a tubular element is provided that includes a radio-frequency identification chip connected to at least one antenna having two conductive strands and a flexible envelope enveloping the radio-frequency identification chip and strands. The envelope is a silicone material and includes a central portion overmolding the radio-frequency identification chip, and two strips extend on either side of the central portion and each strip overmolds at least one strand. Each of the two strips has a free end with a pierced boss capable of cooperating with a hose clamp. The two strips are thermoformed in a twisted configuration around a common twisting axis.

16 Claims, 5 Drawing Sheets

(51) Int. Cl.
*G06K 19/04* (2006.01)
*G06K 19/077* (2006.01)

(52) U.S. Cl.
CPC ... *G06K 19/0779* (2013.01); *G06K 19/07773* (2013.01); *G06K 19/07786* (2013.01); *H01Q 1/2208* (2013.01)

(56) References Cited

U.S. PATENT DOCUMENTS

| | | | |
|---|---|---|---|
| 8,540,632 B2* | 9/2013 | Robertson | A61B 1/00016 600/302 |
| 9,208,426 B2* | 12/2015 | Buehler | G06K 19/07749 |
| 2006/0186210 A1* | 8/2006 | Tethrake | G06K 19/005 235/492 |
| 2010/0123586 A1* | 5/2010 | Baba | G06K 19/07749 340/572.8 |
| 2013/0140370 A1* | 6/2013 | Finn | G06K 19/07769 235/492 |

\* cited by examiner

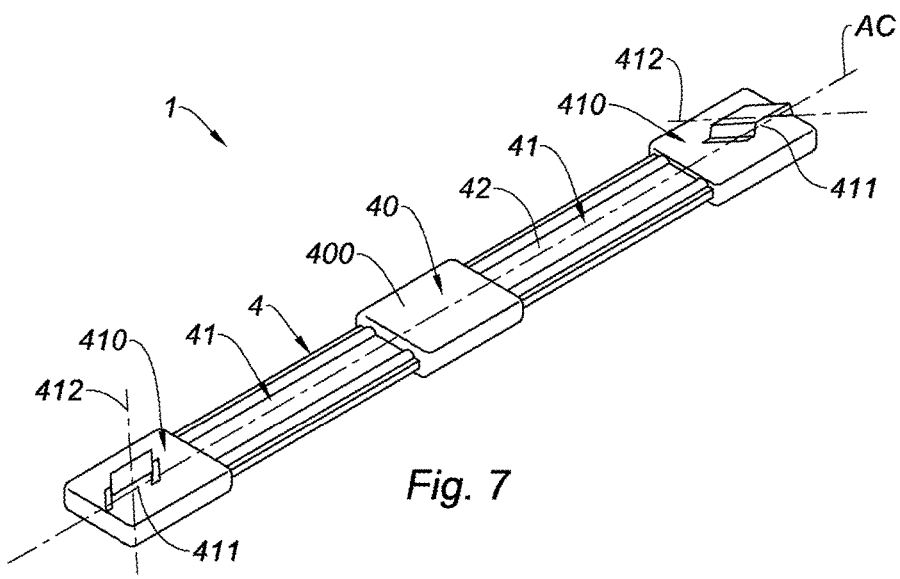
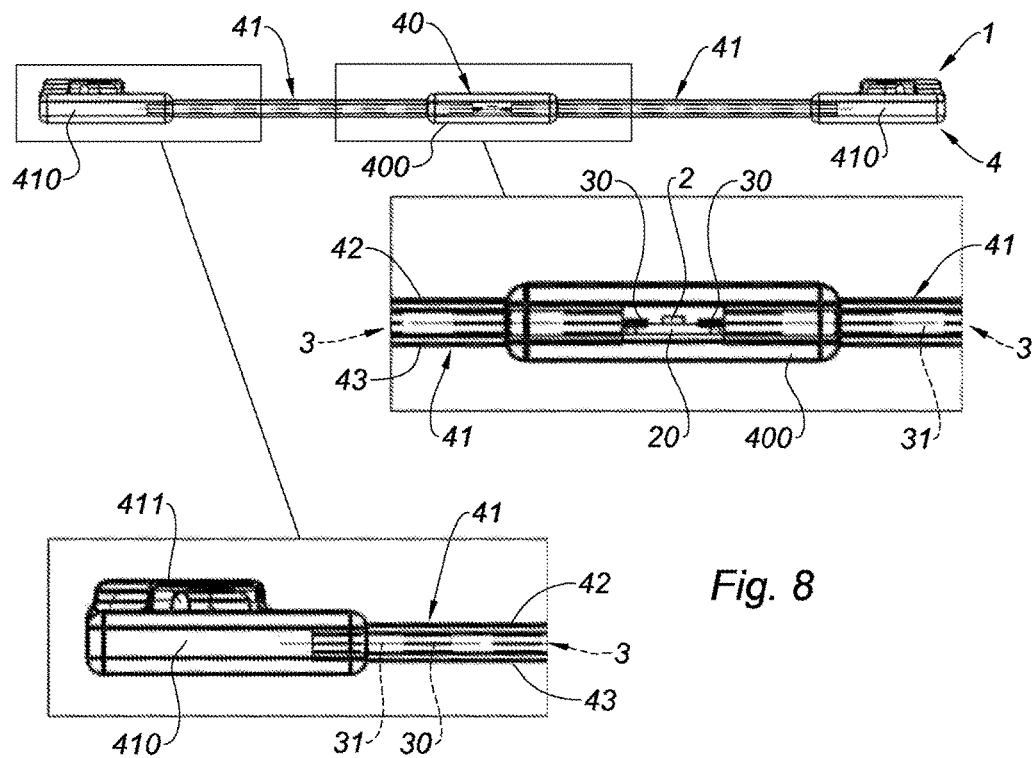

RADIO-FREQUENCY IDENTIFICATION DEVICE FOR A TUBULAR ELEMENT TO BE IDENTIFIED IN A CONSTRAINED ENVIRONMENT

CROSS-REFERENCE TO RELATED APPLICATIONS

This application is a continuation of International Application No. PCT/FR2016/051896, filed on Jul. 21, 2016, which claims priority to and the benefit of FR 15/56877 filed on Jul. 21, 2015. The disclosures of the above applications are incorporated herein by reference.

FIELD

The present disclosure relates to radio-frequency identification device for a tubular element to be identified, and more particularly to a radio-frequency identification device for identifying a fluid circulation conduit, an electrical cable, a braided sheath or a metallic sheath.

BACKGROUND

The statements in this section merely provide background information related to the present disclosure and may not constitute prior art.

In the fields of automotive industry, energy and in particular nuclear energy, telecommunications, avionics, industrial machines, electronic appliances, communication networks, and in a general manner in the industrial field, it is often complex to ensure the individual identification of the cables, conduits and other tubular elements, for the purposes of servicing, repair, maintenance, traceability, logistics, distribution, configuration management or tamper-resistant safety.

To this end, it is known, in particular from the document EP 2 765 537 A1, to use radio-frequency identification devices mounted on such tubular elements, in order to establish a radio-frequency identification according to the RFID technology.

Document EP 2 765 537 A1 proposes a radio-frequency identification device comprising a radio-frequency identification chip connected to a dipolar antenna with strands, with an envelope made of a shape-memory material, such as in particular polytetrafluoroethylene. The radio-frequency identification device is fastened on the tubular element by taking advantage of the shape-memory characteristics of the envelope, and more specifically by arranging the envelope in the form of a twisted ribbon and by ensuring the fastening by clasping by performing a retraction subsequently to a stretching.

However, it turns out that such a fastening by clasping subsequently to a stretching, using the shape-memory properties of the envelope, does not offer a sufficient mechanical strength under all conditions.

Indeed, in environments called constrained environments subjected to vibrations, and possibly to considerable temperature variations and/or chemically toxic or corrosive atmospheres and/or severe pressure conditions, it is essential to guarantee a durable and stable fastening of the radio-frequency identification device on the element to be identified, while offering an effective protection of the radio-frequency identification chip.

There is also known from U.S. Patent Application No. 2006/0186210 a radio-frequency identification device for a tubular element, where the device comprises a flexible sleeve protecting an RFID transponder in connection with an antenna which forms at least one peripheral turn in order to enable proceeding to reading regardless of the orientation. However, such a device turns out to be impractical, because it requires fitting the sleeve around the tubular element, which completely prohibitive for cables or conduits networks, in particular in bulky and difficult to access spaces. In addition, such a device may have sealing issues and also defects in stable holding around the tubular element. Indeed, the sleeve is held only by elastic tightening and by friction, which cannot be considered in constrained environments subjected to high vibrations and to considerable temperature variations.

SUMMARY

The present disclosure addresses the issue of holding a radio-frequency identification device on a tubular element, while enabling a radio-frequency identification reading in all directions (in order to overcome the final position of the radio-frequency identification device on the tubular element), at reasonable detection distances, in particular in the range of at least 1 to 2 meter, the detection distance corresponding to the minimum distance necessary for the detection of the radio-frequency identification device by an appropriate reader, and possibly for writing on the radio-frequency identification chip.

The present disclosure provides a radio-frequency identification device for a tubular element to be identified in a constrained environment, said radio-frequency identification device comprising a radio-frequency identification chip connected to at least one antenna having two conductive strands connected to the radio-frequency identification chip, and a flexible envelope completely enveloping said radio-frequency identification chip and said strands.

This radio-frequency identification device is remarkable in that:

the envelope is made by overmolding with a silicone material of the radio-frequency identification chip and of the strands of the antennas, this envelope having a central portion overmolding the radio-frequency identification chip and having two strips, extending on either side of the central portion, which each overmold at least one strand;

the two strips of the envelope are thermoformed according to a twisted configuration around a common twisting axis in order to enable a temporary holding of said device around said element; and each of the two strips has a free end provided with a pierced boss capable of cooperating with a hose clamp in order to enable a final fastening of said device around said element.

Thus, the envelope is made of silicone, a material offering excellent properties in terms of thermal protection and vibration isolation, and allowing a thermoforming of the envelope in a twisted (or helical) shape which is stable and which will allow positioning the radio-frequency identification device temporarily on the tubular element, before achieving a durable anchorage by means of at least two hose clamps passing in the orifices or holes of the pierced bosses. The tightening at the level of the free ends of the strips provides a holding over the entire length of the envelope.

Advantageously, the central portion also has a pierced boss capable of cooperating with a hose clamp.

The tightening at the level of the central portion provides extreme stability of the radio-frequency identification chip.

In one form, before thermoforming, the two strips of the envelope extend, from the central portion up to their respective free ends, according to two main axes, wherein these two main axes intersect at an angle comprised between 60 and 120 degrees, so that the envelope has a general "V" shape.

The Applicant has observed that such a "V" shape confers improved performances in terms of detection distance and detection angles around the tubular element.

Advantageously, the two main axes intersect at an angle comprised between 75 and 105 degrees, and in particular between 85 and 95 degrees, for an enhanced reading performance.

In another form, before thermoforming, the two strips of the envelope extend, from the central portion up to their respective free ends, according to the same common main axis, so that the envelope has a rectilinear general shape.

Although less performing than the first "V" shaped form, this second form still offers interesting performances in terms of detection distance, for detecting and possibly for writing on the radio-frequency identification chip.

According to one feature, before thermoforming, each strip of the envelope extends, from the central portion up to its free end, according to a main axis, and the corresponding boss has a hole extending according to a passage axis inclined with respect to said main axis at an angle comprised between 30 and 60 degrees.

This inclination of the holes for the passage of the hose clamps is advantageous for guiding the hose clamps along the circumference of the element to be identified, by taking into account the twisted shape of the strips of the envelope.

According to another feature, the envelope has an inner face intended to bear against the element to be identified, and an opposite outer face, wherein the bosses protrude from said outer face and/or from said inner face.

It should be noted that the inner face may be planar, smooth or still have, over all or part of its surface area, rough elements promoting the gripping on the element to be identified. In particular, in one variation, these rough elements may be provided only at the level of the bosses.

According to another feature, each of the strands is sheathed with a sheath made of a dielectric thermoplastic material, inside the envelope which overmolds said sheaths.

Such sheaths allow protection and stabilization of the strands during the operation of overmolding the envelope.

In one aspect, the device comprises two double-stranded antennas, each strip of the envelope overmolding two adjacent strands spaced apart from each other.

With two double-stranded antennas, two configurations may be considered, namely:

a configuration (a) with a first antenna having its two strands in a first strip, and a second antenna having its two strands in a second strip; and a configuration (b) with a first antenna having a first strand in a first strip and a second strand in a second strip, and a second antenna having a first strand in a first strip and a second strand in a second strip.

In the configuration (b), two forms are possible, namely:

a first form wherein the first strand of the first antenna is in the extension (or the alignment) of the second strand of the first antenna, and wherein the first strand of the second antenna is in the extension (or the alignment) of the second strand of the second antenna; and a second form wherein the first strand of the first antenna is in the extension (or the alignment) of the first strand of the second antenna, and wherein the second strand of the first antenna is in the extension (or the alignment) of the second strand of the second antenna.

Alternatively, the device comprises one single double-stranded antenna, with a first strand in a first strip and a second strand in a second strip.

In accordance with an advantageous feature of the present disclosure, inside each strip, the two sheaths overmolding the concerned two strands are longitudinally linked to each other by a ribbon which maintains a constant spacing between the two sheaths.

Such a ribbon is particularly adapted to address the requirements of constrained environments, and to allow improved operation despite the high pressures, the variations of temperature and the vibrations.

In one aspect, inside each strip, the ribbon is made by overmolding of the sheaths.

According to a possibility of the present disclosure, the radio-frequency identification chip is soldered on an electronic board on which the strands are soldered.

The present disclosure also concerns a method for manufacturing a radio-frequency identification device in accordance with the present disclosure, comprising the following steps of:

connecting the strands to the radio-frequency identification chip;

making an envelope in a silicone material by overmolding of said radio-frequency identification chip and the strands of said antennas, so that the envelope has a central portion overmolding the radio-frequency identification chip and two strips, extending on either side of said central portion, respectively overmolding the strands of the antennas, wherein each of the two strips has a free end provided with a pierced boss capable of cooperating with a hose clamp; and thermoforming the envelope so that the two strips of the envelope are thermoformed according to a twisted configuration around a common twisting axis.

The present disclosure also relates to a use of a radio-frequency identification device in accordance with the present disclosure, to identify a tubular element to be identified, such as in particular an electrical cable, a fluid circulation conduit, a braided sheath or a metallic sheath, by positioning the twisted strips of the envelope around the element to be identified, and by tightening said envelope by means of at least two hose clamps passing through the pierced bosses of the envelope and clasping said element to be identified.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 7 is a schematic perspective view of a second form of a radio-frequency identification device before thermoforming in accordance with the present disclosure;

FIG. 8 is a schematic profile view of the radio-frequency identification device of FIG. 7 with two portions enlarged for more clarity;

Figure 13:
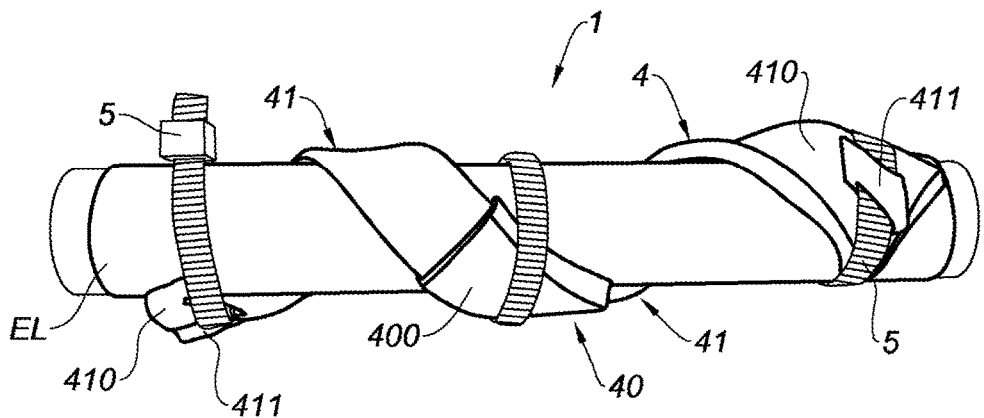
Figure 14:
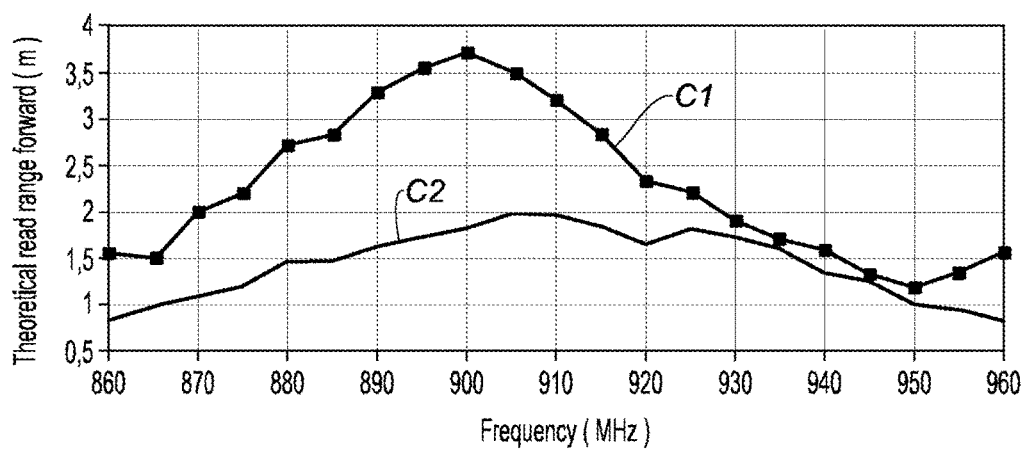

FIG. 13 is a schematic perspective view of a second form of a radio-frequency identification device after a thermoforming operation and in place on an element to be identified in accordance with the present disclosure; and FIG. 14 represents curves of a variation of a maximum detection distance as a function of a frequency of a radio-frequency identification signal for a first and a second radio-frequency identification device in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In general, a radio-frequency identification device 1 in accordance with the present disclosure is provided to be fastened on a tubular element EL to be identified, in order to enable the radio-frequency identification of such an element EL with an appropriate radio-frequency identification reader. The following description covers two non-limiting forms, among which the first form is described with reference to FIGS. 1 to 5 and 11, and the second form is described with reference to FIGS. 7 to 10, 12 and 13.

The radio-frequency identification device 1 comprises a radio-frequency identification chip 2 (shown in FIG. 4 for the first form and in FIGS. 8 and 9 for the second form) soldered on an electronic board 20, as well as two antennas 3 each comprising two conductive strands 30 connected to the chip 2 by being soldered on the electronic board 20.

The strands 30 extend on either side of the chip 2, respectively at the right side and at the left side, with two strands at the right side and two strands at the left side. The two right-side strands may be associated to a first antenna, and the two left-side strands may be associated to a second antenna. Alternatively, a right-side strand and a left-side strand are associated to a first antenna, and the other right-side strand and the other left-side strand are associated to a second antenna. It would have also been possible to consider providing one single antenna having a right-side strand and a left-side strand.

Figure 4:
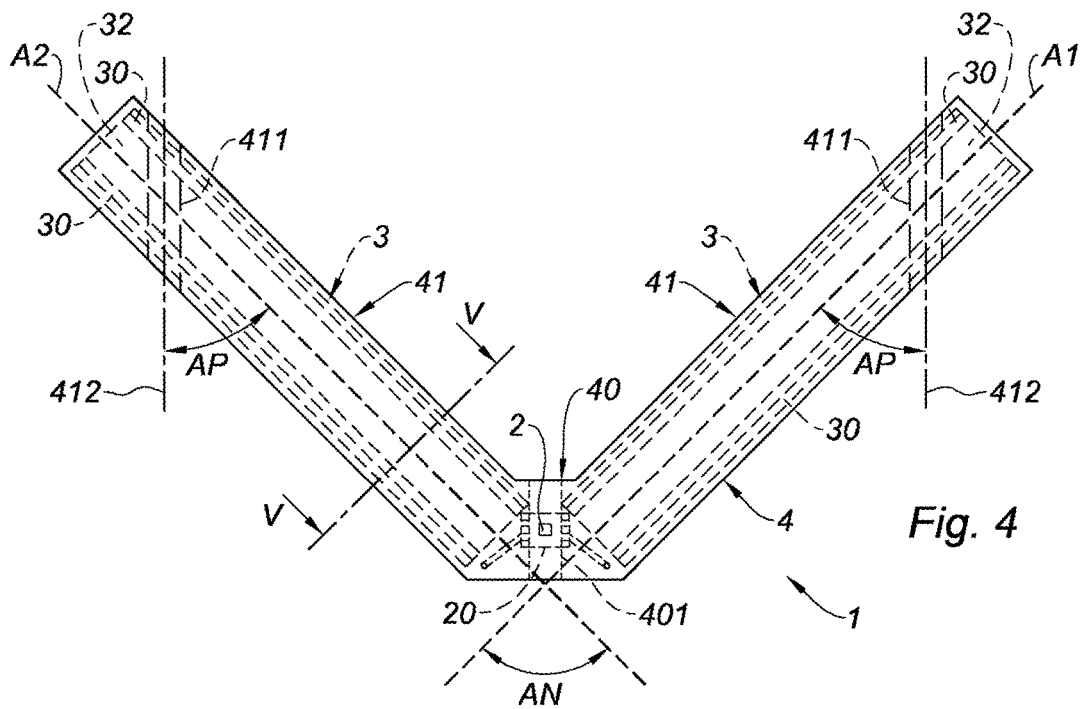
FIG. 4 is a schematic top view of the first form of the radio-frequency identification device of FIGS. 1 and 2, in which an inner element is illustrated in dashed lines.
Figure 5:
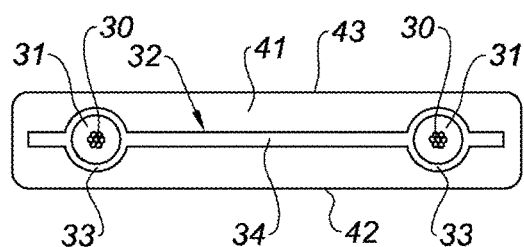
FIG. 5 is a schematic view of the first form of the radio-frequency identification device, according to a section plane V-V of FIG. 4.
Figure 6:
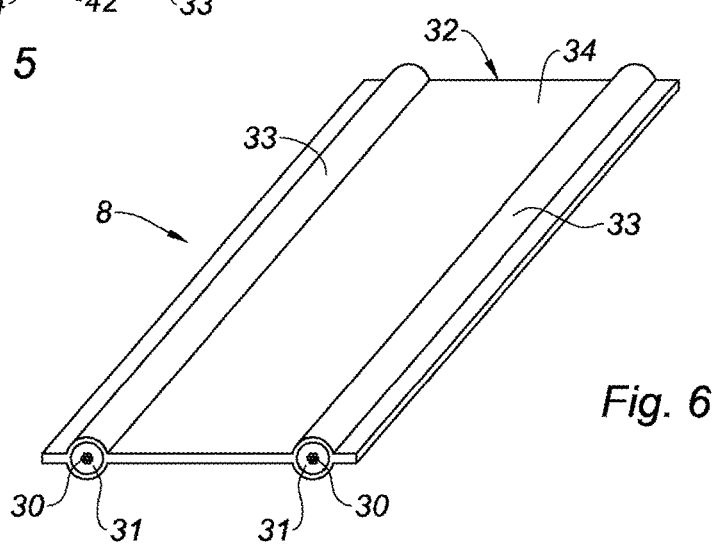
FIG. 6 is a schematic perspective view of two antenna strands sheathed in sheaths assembled to a ribbon, serving to make an antenna for a radio-frequency identification device in accordance with the present disclosure.
Figure 9:
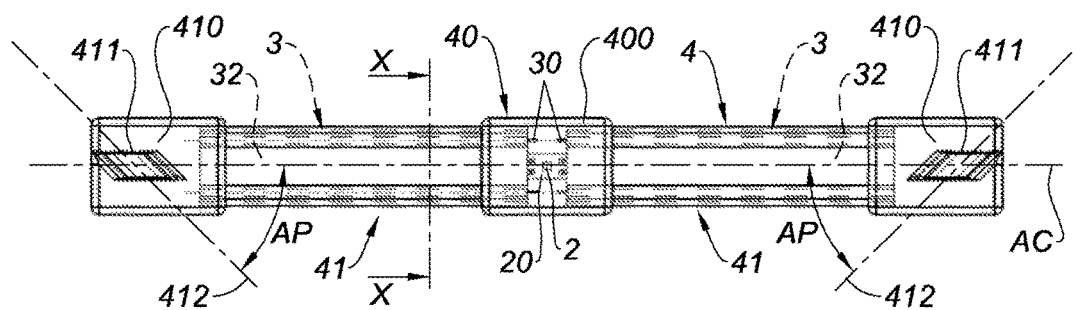
FIG. 9 is a schematic top view of the radio-frequency identification device of FIG. 7.
Figure 10:
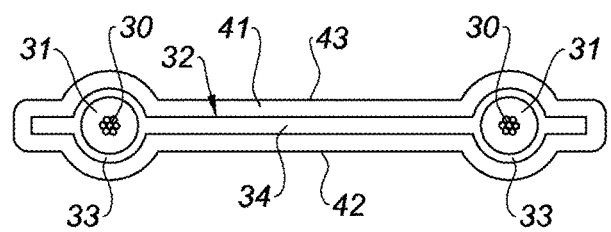
FIG. 10 is a schematic view of the radio-frequency identification device according to a section plane X-X of FIG. 9.

As shown in FIGS. 4 and 5 for the first form and in FIGS. 8 to 10 for the second form, and also in FIG. 6 associated to both forms, each pair of strands 30 (at the right side as well as the left side) is supplied in the form of a strip called primary strip 8 (shown alone in FIG. 6) comprising:

the two strands 30, each sheathed with a sheath 31 made of a dielectric material, such as for example a PTFE (Polytetrafluoroethylene) polymer, each strand 30 may be composed of a metallic wire or of a set of several metallic wires; and a ribbon 32 which overmolds the two sheaths 31 and which has two end portions 33 which overmold the respective sheaths 31, and a central portion 34 which forms a thin strip which maintains the two sheaths 31 parallel to each other, so that the two sheaths 31 (and therefore the two strands 30) are maintained away from each other with a constant spacing, said ribbon 32 being made of a dielectric thermoplastic material.

For example, the dielectric thermoplastic material of the ribbon 32 is a FEP (Perfluoro Ethylene Propylene) polymer material.

Thus, the pair of strands 30/sheaths 31/ribbon 32 set is supplied in the form of this primary strip 8 which will be cut to the desired length; such a primary strip 8 may be used for both the first device of FIGS. 1 to 5 as well as for the second device of FIGS. 7 to 10.

At one end of this primary strip 8, the ribbon 32 and the sheaths 31 are stripped off in order to expose the strands 30 to enable a connection by soldering with the electronic board 20, in particular by directly soldering each strand 30 on the electronic board 20.

The device 1 further comprises an envelope 4 made of silicone which completely envelops the chip 2, the electronic board 20 and the two primary strands 8, and therefore the two pairs of strands 30.

This envelope 4 is made by overmolding and has:

a central portion 40 which overmolds the chip 2 and the electronic board 20; and two strips 41 which overmold the two primary strips 8, and consequently the pairs of strands 30 of the antennas 3, these two strips 41 extending on either side of the central portion 40, respectively at the right side and at the left side.

The central portion 40 has a boss 400 which forms a thickened portion in comparison with the thicknesses of the two strips 41.

In the first form, this boss 400 is pierced with a hole 401 (FIGS. 1 to 3) capable of cooperating with a hose clamp 5, whereas in the second form, this boss 400 is not pierced.

In both forms, each of the two strips 41 has a free end also provided with a boss 410 pierced with a hole 411 capable of cooperating with a hose clamp 5. These bosses 400 form thickened portions, in comparison with the thicknesses of the strips 41 considered between the central portion 40 and the bosses 410.

Figure 11:
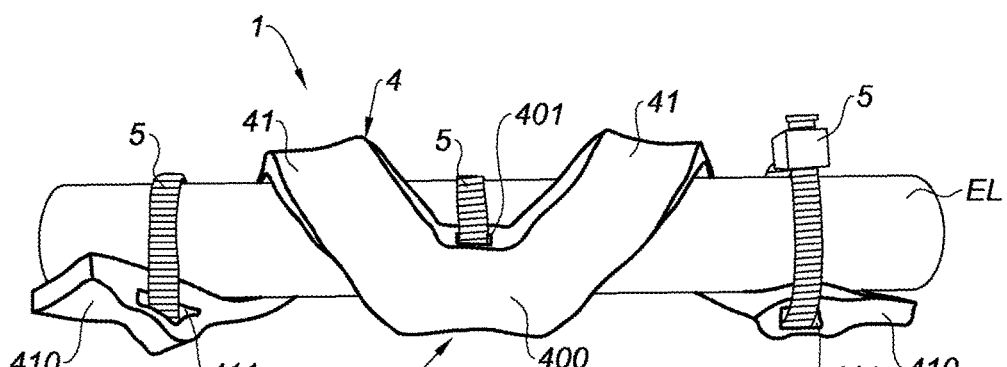
FIG. 11 is a schematic perspective view of a first form of a radio-frequency identification device after a thermoforming operation and in place on an element to be identified in accordance with the present disclosure.

Thus, and as shown in FIGS. 11 and 13, the envelope 4 has two or three holes 401, 411 provided for the passage of respective hose clamps 5, in particular of the RILSAN™ clamp or TY-RAP™ clamp type.

It should be noted that the holes 401, 411 may be for example delimited by protruding arches atop the bosses, or yet be made directly in the material of the bosses.

The strips 41 have an inner face 42 provided to bear against the element EL, the inner face 42 may be substantially planar and smooth or still optionally have, over all or part of its surface area, rough elements (such as in particular grains, teeth or tips) which will reinforce the gripping of the envelope 4 on the element EL. The envelope 4 also has an opposite outer face 43.

Figure 1:
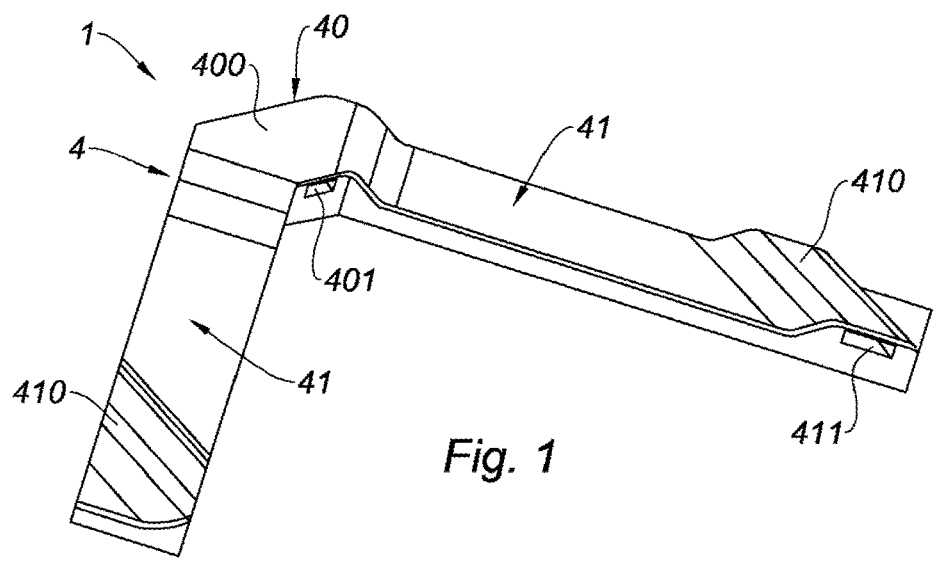
FIG. 1 is a schematic perspective view of a first form of a radio-frequency identification device before thermoforming in accordance with the present disclosure.
Figure 2:
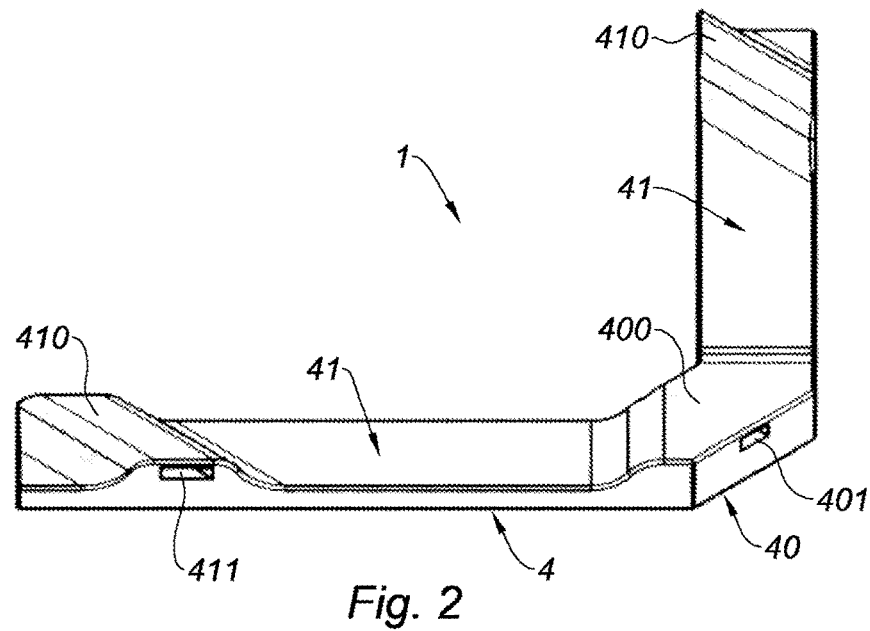
FIG. 2 is another schematic perspective view of the first form of the radio-frequency identification device before thermoforming of FIG. 1.
Figure 3:
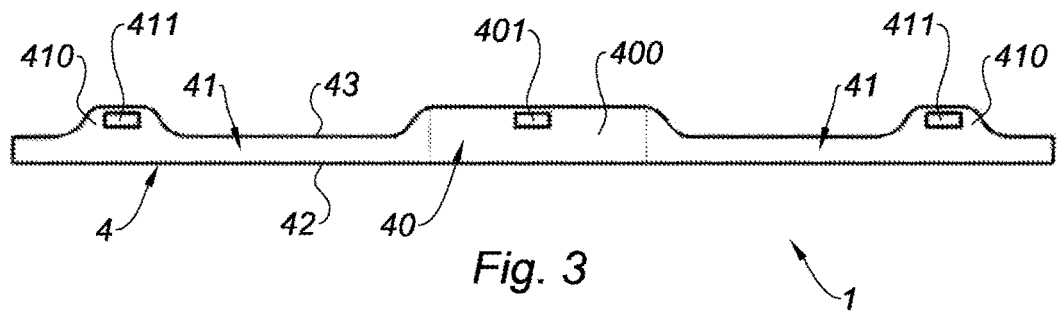
FIG. 3 is a schematic profile view of the first form of the radio-frequency identification device of FIGS. 1 and 2.

In the first form, and as shown in FIG. 3, the three bosses 400, 410 protrude from the outer faces 43 of the strips 41, without surpassing the inner faces 42, so that the envelope 4 has a continuous inner face 42 (smooth with rough elements).

In the second form, and as shown in FIG. 8, the three bosses 400, 410 protrude from both the inner 42 and outer 43 faces of the strips 41, so that the envelope 4 has a discontinuous inner face 42 with steps at the level of the bosses 400, 410. For example, the rough elements may be provided only on the inside of the bosses 400, 410 according to one variation.

Of course, the shape of the bosses 400, 410 of the first device 1 may be applied to the second device 1, and vice versa.

In the first form illustrated in FIGS. 1 to 4, the two strips 41 of the envelope 4 extend, from the central portion 40 up to their respective free ends, according to two main axes A1, A2, where the two main axes A1, A2 intersect at an angle AN comprised between 85 and 95 degrees, so that the envelope 4 has a general "V" shape.

In the second form and as shown in FIG. 9, the two strips 41 of the envelope 4 extend, from the central portion 40 up to their respective free ends, according to the same common main axis AC, so that the envelope 4 has a rectilinear general shape.

Moreover, in both forms, and as shown in FIGS. 4 to 9, the hole 411 of each end boss 410 extends according to a passage axis 412 inclined with respect to the main axis A1, A2, AC corresponding to an angle AP comprised between 30 and 60 degrees, and in particular in the range of 45 degrees. Thus, and as shown in FIGS. 11 and 13, after the twisted winding of the strips 41 around the element EL to be identified, the holes 411 extend substantially orthogonally to the element EL, so that the hose clamps 5 are wound around the element EL orthogonally to the latter.

As shown in FIG. 13, although the second device 1 device does not have holes on the boss 400 of the central portion 40, it is nevertheless possible to consider providing a third hose clamp 5 which passes above this boss 400 to clasp it around the element EL.

The method for manufacturing the radio-frequency identification device 1 may include a first sequence comprising the following steps of:

providing two cables each comprising one strand 30 (with one or several semi-rigid metallic wires) sheathed with a sheath 31;

making a ribbon 32 with the two cables (strand 30 and sheath 31) inside, with a desired and observed spacing distance between the two sheaths 31, so as to form the aforementioned primary strip 8, this ribbon 32 may be made by overmolding;

a first operation of overmolding with silicone comprising overmolding with a silicone material the ribbon 32 (in other words the primary strip 8 and its strands 30), in particular according to an extrusion process, in order to form a strip called secondary strip comprising the two strands 30 sheathed with the sheaths 31, the ribbon 32 and the silicone overmolding layer;

cutting the secondary strip into two sections with the same predefined length (these sections forming the future strips 41 of the envelope 4), the length of the sections or strips 41 being predefined so as to obtain enhanced adaptation between the impedance of the antenna 3 and the conjugate impedance of the chip 2 while taking into account the element EL to be identified;

exposing the strands 30 at one end of each section, by stripping off the ribbons 32 and the sheaths 31;

soldering the strands 30 to the electronic board 20, on which is soldered the chip 2, while taking care to orientate the main axes of the sections (or strips 41) according to the desired angle (either a substantially right angle in the first form, or a substantially zero angle in the second form); and a second operation of overmolding with silicone, in particular according to a molding process, comprising overmolding with a silicone material:

the chip 2, the electronic board 20 and the exposed ends of the strands 30 in order to form the central portion 40 with its boss 400; and the free ends of the sections in order to form the bosses 410 and to cover the ends of the sections.

In the forms illustrated in the figures, each strip 41 envelops two antenna strands 30, so that the device 1 comprises two dipolar or double-stranded antennas 3.

With two double-stranded antennas 3, two configurations may be considered, namely:

a configuration (a) with a first antenna 3 having its two strands 30 in a first strip (the right-side one), and a second antenna 3 having its two strands 30 in a second strip (the left-side one); or a configuration (b) with a first antenna 3 having a first strand 30 in a first strip (the right-side one) and a second strand 30 in a second strip (the left-side one), and a second antenna 3 having a first strand 30 in a first strip (the right-side one) and a second strand in a second strip (the left-side one).

In the configuration (a), the device 1 therefore comprises two opposite antennas 3, on either side of the chip 2.

In the configuration (b), the device 1 therefore comprises two antennas 3 each having two opposite strands 30 on either side of the chip 2.

In the configuration (b), two forms are possible, namely:

a first form where the first strand 30 of the first antenna 3 is in the extension (or the alignment) of the second strand 30 of the first antenna 3, and where the first strand 30 of the second antenna 3 is in the extension (or the alignment) of the second strand 30 of the second antenna 3; and a second form where the first strand 30 of the first antenna 3 is in the extension (or the alignment) of the first strand 30 of the second antenna 3, and where the second strand 30 of the first antenna 3 is in the extension (or the alignment) of the second strand 30 of the second antenna 3.

The silicone material used during the two overmolding operations forms a hydrophobic material, guaranteed against fungi and mildew, resisting sand and dust, having elastic properties adapted to its use, and offering thermoforming properties desired in the second sequence of the manufacturing method of the radio-frequency identification device 1. In other words, the device 1 may be subjected to high temperatures, high pressures and will be capable of withstanding different aggressions (fire, different liquids, thermal variations, pressure variations . . . ).

The second sequence of the manufacturing method comprises thermoforming the envelope 4 so that the two strips 41 are thermoformed according to a twisted configuration around a common twisting axis.

This thermoforming operation is carried out in an oven at a temperature comprised between 80 and 100° C., until the strips 41 take on a helical or twisted shape, in particular around a jig.

Figure 12:
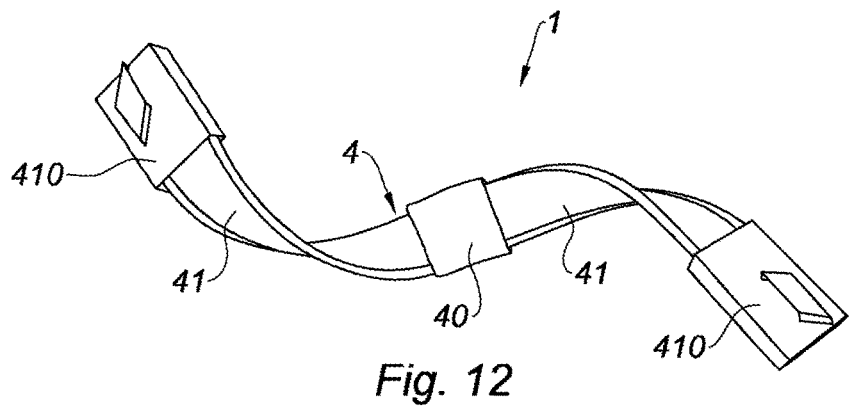
FIG. 12 is a schematic perspective view of a second form of a radio-frequency identification device after the thermoforming operation in accordance with the present disclosure.

Afterwards, after cooling, and as shown in FIG. 12 for the second device 1, the strips 41 will have a solid twisted shape and the radio-frequency identification device 1 is ready to be placed on the element EL.

Referring to FIGS. 11 and 13, the radio-frequency identification device 1 is used by fastening it on the element EL as follows:

the twisted strips 41 are positioned (or wound) around the element EL; and two or three hose clamps 5 are placed in the holes 401, 411 of the respective bosses 400,410, and are afterwards clasped around the element EL in order to clamp and press the device 1 on the element EL.

The devices 1 in accordance with either one of the two forms described hereinabove, have excellent performances in terms of detection distance, even in constrained environments, as illustrated in FIG. 14 which are modellings of the variation of the maximum detection distance as a function of frequency for the first device 1 (curve C1) and for the second device 1 (curve C2).

In the models of FIG. 14, the maximum detection distance has a maximum of about 3.70 meter for the first device 1 and about 2 meter for the second device 1. It should also be noted that the first device 1 outperforms the second device 1. In practice, it should be noted that the maximum detection distance is larger and varies between 2.5 meter and about 4 meter.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A radio-frequency identification device for a tubular element to be identified in a constrained environment, said radio-frequency identification device comprising:
    a radio-frequency identification chip connected to at least one antenna having two conductive strands connected to the radio-frequency identification chip; and
    a flexible envelope completely enveloping said radio-frequency identification chip and said two conductive strands,
    wherein the flexible envelope is made by an overmolding with a silicone material of said radio-frequency identification chip and of the two conductive strands, said flexible envelope comprising:
        a central portion overmolding the radio-frequency identification chip; and
        two strips extending on either side of said central portion, each strip overmolds at least one of the two conductive strands,
    wherein the two strips of the flexible envelope are thermoformed in a twisted configuration around a common twisting axis to temporarily hold said radio-frequency identification device around said tubular element, and
    wherein each of the two strips includes a free end having a pierced boss configured to cooperate with a hose clamp for final fastening of said radio-frequency identification device around said tubular element.

2. The radio-frequency identification device according to claim 1, wherein the central portion further includes a pierced boss capable of cooperating with a hose clamp.

3. The radio-frequency identification device according to claim 1, wherein, before thermoforming, the two strips of the flexible envelope extend from the central portion up to their respective free ends according to two main axes, wherein said two main axes intersect at an angle between 60 and 120 degrees such that the flexible envelope has a "V" shape.

4. The radio-frequency identification device according to claim 3, wherein the two main axes intersect at an angle between 75 and 105 degrees.

5. The radio-frequency identification device according to claim 3, wherein the two main axes intersect at an angle between 85 and 95 degrees.

6. The radio-frequency identification device according to claim 1, wherein, before thermoforming, the two strips of the flexible envelope extend from the central portion up to their respective free ends according to a common main axis such that the flexible envelope has a rectilinear shape.

7. The radio-frequency identification device according to claim 1, wherein, before thermoforming, each strip of the flexible envelope extends from the central portion up to its free end according to a main axis, and a corresponding boss includes a hole extending according to a passage axis inclined with respect to said main axis at an angle between 30 and 60 degrees.

8. The radio-frequency identification device according to claim 1, wherein each of the two conductive strands includes a sheath made of a dielectric material is and disposed inside the flexible envelope that overmolds said sheaths.

9. The radio-frequency identification device according to claim 8 further comprising two double-stranded antennas, each double-stranded antenna comprising two conductive strands,
    wherein each strip of the flexible envelope overmolds two adjacent conductive strands spaced apart from each other, and
    wherein, inside each strip of the flexible envelope, the sheaths of the two conductive strands are longitudinally linked by a ribbon made of a thermoplastic material that overmolds the two sheaths and maintains a constant spacing between the two sheaths.

10. The radio-frequency identification device according to claim 9, wherein the two conductive strands of a first antenna of the two double-stranded antennas extends in a first strip of the flexible envelope, and the two conductive strands of a second antenna of the two double-stranded antennas extends in a second strip of the flexible envelope.

11. The radio-frequency identification device according to claim 9, wherein one conductive strand of each of the two antennas extends in a first strip of the flexible envelope and the other conductive strand of each of the two antennas extends in a second strip of the flexible envelope.

12. The radio-frequency identification device according to claim 1 further comprising two double-stranded antennas, each double-stranded antennas comprising two conductive strands, wherein each strip of the flexible envelope overmolds two adjacent conductive strands spaced apart from each other.

13. The radio-frequency identification device according to claim 1, wherein the radio-frequency identification chip is soldered on an electronic board on which the conductive strands are soldered.

14. A method of identifying a tubular element, the method comprising:
    providing the radio-frequency identification device of claim 1;

positioning the two twisted strips of the flexible envelope around the tubular element to be identified;

tightening said flexible envelope with at least two hose clamps passing through the pierced bosses of the flexible envelope; and clasping said tubular element to be identified.

15. The method according to claim 14, wherein the tubular element is an electric cable, a fluid circulation conduit, a braided sheath or a metallic sheath.

16. A method for manufacturing a radio-frequency identification device comprising the steps:

connecting two conductive strands of at least one antenna to a radio-frequency identification chip;

enveloping the radio-frequency identification chip and two conductive strands with a flexible envelope made of a silicone material by overmolding said radio-frequency identification chip and the two conductive strands such that the flexible envelope includes:

a central portion overmolding the radio-frequency identification chip; and two strips extending on either side of said central portion, wherein each strip overmolds at least one conductive strand of the two conducive strands, wherein each of the two strips has a free end provided with a pierced boss capable of cooperating with a hose clamp; and thermoforming the flexible envelope such that the two strips of the flexible envelope are thermoformed into a twisted configuration around a common twisting axis.

* * * * *